(12) United States Patent
Son

(10) Patent No.: US 12,494,534 B2
(45) Date of Patent: Dec. 9, 2025

(54) CAP ASSEMBLY, SECONDARY BATTERY COMPRISING THE SAME, AND BATTERY PACK

(71) Applicant: LG Energy Solution, Ltd., Seoul (KR)

(72) Inventor: Jong In Son, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 589 days.

(21) Appl. No.: 17/789,889

(22) PCT Filed: Feb. 3, 2021

(86) PCT No.: PCT/KR2021/001392
§ 371 (c)(1),
(2) Date: Jun. 29, 2022

(87) PCT Pub. No.: WO2021/158005
PCT Pub. Date: Aug. 12, 2021

(65) Prior Publication Data
US 2023/0056045 A1 Feb. 23, 2023

(30) Foreign Application Priority Data

Feb. 6, 2020 (KR) .................. 10-2020-0014554

(51) Int. Cl.
*H01M 50/533* (2021.01)
*H01M 50/152* (2021.01)
(Continued)

(52) U.S. Cl.
CPC ....... *H01M 50/152* (2021.01); *H01M 50/183* (2021.01); *H01M 50/3425* (2021.01); *H01M 50/533* (2021.01); *H01M 50/583* (2021.01)

(58) Field of Classification Search
CPC ......... H01M 50/147–171; H01M 50/183–198; H01M 50/574–583; H01M 50/30–394; H01M 50/308–333
See application file for complete search history.

(56) References Cited

U.S. PATENT DOCUMENTS 6,322,921 B1 11/2001 Iwaizono et al.
2009/0117459 A1* 5/2009 Hyung .............. H01M 50/3425
429/185
(Continued)

FOREIGN PATENT DOCUMENTS

CN 107579198 A 1/2018
EP 3598524 A1 1/2020
(Continued)

OTHER PUBLICATIONS

Extended European Search Report for Application No. 21751334.0 dated Feb. 29, 2024, 6 pages.

(Continued)

*Primary Examiner* — Parviz Hassanzadeh
(74) *Attorney, Agent, or Firm* — Lerner David LLP

(57) ABSTRACT

The present invention relates to a secondary battery. The secondary battery comprises: an electrode assembly; a can configured to accommodate the electrode assembly; an electrolyte impregnated into the electrode assembly while being injected into the can; and a cap assembly mounted on an opening of the can, wherein the cap assembly comprises: a top cap in which a top hole is formed to pass vertically; a safety vent which is provided under the top cap and in which a vent hole is formed to pass vertically; and a current interrupt device (CID) filter which is provided under the safety vent, to which a positive electrode tab provided in the electrode assembly is coupled, and in which a CID hole is formed to pass vertically, wherein the CID hole is closed or opened by the positive electrode tab.

13 Claims, 18 Drawing Sheets

(51) Int. Cl.
*H01M 50/183* (2021.01)
*H01M 50/342* (2021.01)
*H01M 50/583* (2021.01)

(56) References Cited

U.S. PATENT DOCUMENTS

| | | | |
|---|---|---|---|
| 2017/0194619 A1* | 7/2017 | Kim | .................... H01M 50/325 |
| 2017/0294641 A1 | 10/2017 | Lee et al. | |
| 2020/0106060 A1 | 4/2020 | Shin et al. | |

FOREIGN PATENT DOCUMENTS

| | | | |
|---|---|---|---|
| JP | 405144425 A | 6/1993 | |
| JP | 2005259355 A | 9/2005 | |
| JP | 2005-285404 A | 10/2005 | |
| KR | 19980057861 A | 9/1998 | |
| KR | 2005-0110499 A | 11/2005 | |
| KR | 2010-0032731 A | 3/2010 | |
| KR | 2015-0037405 A | 4/2015 | |
| KR | 20150062739 A | 6/2015 | |
| KR | 20160039804 A | 4/2016 | |
| KR | 20160051037 A | 5/2016 | |
| KR | 20170070542 A | 6/2017 | |
| KR | 101768656 B1 | 8/2017 | |
| KR | 101828126 B1 | 2/2018 | |
| KR | 2018-0023696 A | 3/2018 | |
| KR | 2018-0131867 A | 12/2018 | |
| KR | 20190109073 A | 9/2019 | |
| WO | 9801913 A1 | 1/1998 | |

OTHER PUBLICATIONS

International Search Report for PCT/KR2021/001392 dated May 17, 2021. 3 pgs.

* cited by examiner

CAP ASSEMBLY, SECONDARY BATTERY COMPRISING THE SAME, AND BATTERY PACK

CROSS-REFERENCE TO RELATED APPLICATION

The present application is a national phase entry under 35 U.S.C. § 371 of International Application No. PCT/KR2021/001392, filed on Feb. 3, 2021, published in Korean, which claims the benefit of the priority of Korean Patent Application No. 10-2020-0014554, filed on Feb. 6, 2020, the entire disclosures of which are hereby incorporated by reference herein.

TECHNICAL FIELD

The present invention relates to a cap assembly, a secondary battery comprising the same, and a battery pack, and more particularly, to a cap assembly from which a gas is easily discharged, a secondary battery comprising the same, and a battery pack.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

The secondary batteries are classified into a can type secondary battery and a pouch type secondary battery, and the can type secondary battery comprises an electrode assembly, an electrolyte, a can accommodating the electrode assembly and the electrolyte, and a cap assembly mounted on an opening of the can.

However, since the cap type secondary battery has a structure in which the inside of a can is sealed, a gas generated inside the can during an activation process is not discharged to the outside, and thus, there is a limit in improving battery performance.

DISCLOSURE OF THE INVENTION

Technical Problem

The present invention has been invented to solve the above problems, and an object of the present invention is to provide a cap assembly from which a gas generated in a can is discharged to the outside after an activation process to improve battery performance, a secondary battery comprising the same, and a battery pack.

Technical Solution

A secondary battery according to the present invention for achieving the above object comprises: an electrode assembly; a can configured to accommodate the electrode assembly; an electrolyte impregnated into the electrode assembly while being injected into the can; and a cap assembly mounted on an opening of the can, wherein the cap assembly comprises: a top cap in which a top hole is formed to pass vertically; a safety vent which is provided under the top cap and in which a vent hole is formed to pass vertically; and a current interrupt device (CID) filter which is provided under the safety vent, to which a positive electrode tab provided in the electrode assembly is coupled, and in which a CID hole is formed to pass vertically, wherein the CID hole is closed or opened by the positive electrode tab.

Since the top hole, the vent hole, and the CID hole are formed in the same vertical line, the positive electrode tab, which closes the CID hole, may be seen from the outside through the top hole, the vent hole, and the CID hole.

The vent hole may have a diameter greater than that of each of the top hole and the CID hole.

The safety vent and the CID filter may be coupled to each other to connect the vent hole to the CID hole.

A gap between an outer circumferential surface of the vent hole and an outer circumferential surface of the CID hole, which are connected to each other, may be sealed.

The positive electrode tab may comprise a lower tab part and an upper tab part, wherein the lower tab part may be connected to the electrode assembly, and the upper tab part may have one end connected to the lower tab part and coupled to the CID filter and the other end that is in surface contact with or separated from a bottom surface of the CID filter, in which the CID hole is formed, to close or open the CID hole.

The positive electrode tab may be made of a material having elastic restoring force so that the other end of the upper tab part is elastically in surface contact with the bottom surface of the CID filter 143.

A lower end of an inner circumferential surface of the CID hole and the positive electrode tab may be coupled to be sealed.

The positive electrode tab may comprise a sealing protrusion inserted into the CID hole to seal the CID hole.

The sealing protrusion may be formed as a hemispherical protrusion.

A sealing ball may be inserted into the CID hole.

The secondary battery may further comprise a closing cover coupled to the top hole, wherein the closing cover may be made of the same material as the top cap.

A battery pack according to the present invention comprises: the secondary battery; and a battery case configured to accommodate one or more secondary batteries.

A cap assembly according to the present invention comprises: a top cap in which a top hole is formed to pass vertically; a safety vent which is provided under the top cap and in which a vent hole is formed to pass vertically; and a CID filter which is provided under the safety vent and in which a CID hole is formed to pass vertically.

The top hole, the vent hole, and the CID hole may be formed in the same vertical line.

Advantageous Effects

The secondary battery according to the present invention may comprise the cap assembly provided with the top cap, the safety vent, and the CID filter. Here, the top hole may be formed in the top cap, the vent hole may be formed in the safety vent, and the CID hole may be formed in the CID filter. The CID hole may be closed by surface-contacting the positive electrode tab coupled to the CID filter. Due to this feature, the positive electrode tab that closes the CID hole of the CID filter may be pressed through the top hole, the vent hole, and the CID hole. Thus, the CID hole may be opened to discharge the gas generated in the can to the outside through the CID hole, the vent hole, and the top hole, thereby significantly improving the battery performance by discharging the gas generated in the can.

In addition, in the secondary battery according to the present invention, the top hole, the vent hole, and the CID hole may be formed in the same vertical line. Due to this feature, the positive electrode tab that closes the CID hole may be seen from the outside through the top hole, the vent hole, and the CID hole, and thus, the positive electrode may be easily pressed to open the CID hole.

The top hole, the vent hole, and the CID hole may partially overlap each other in the same vertical line. That is, when viewed from the top of the cap assembly, the top hole, the vent hole, and the CID hole may only partially overlap each other to prevent the unnecessary foreign substances from being introduced.

In addition, in the secondary battery according to the present invention, the vent hole may have a diameter greater than that of each of the top hole and the CID hole. Due to this feature, the tool passing through the top hole may more effectively pass through the vent hole, and in particular, to prevent the vent hole from being damaged by the tool.

In addition, in the secondary battery according to the present invention, the safety vent and the CID filter may be coupled to each other to connect the vent hole to the CID hole. Due to this feature, the tool passing through the top hole may be effectively inserted into the vent hole and the CID hole.

In addition, in the secondary battery according to the present invention, the positive electrode tab may be made of the material having the elastic restoring force. Due to this feature, the positive electrode tab may be in surface contact with the bottom surface of the CID filter. Thus, the CID hole may be stably closed to prevent the CID hole from being unintentionally opened.

In addition, in the secondary battery according to the present invention, the hemispherical sealing protrusion that seals the CID hole while being inserted into the CID hole may be formed on the positive electrode tab. Due to this features, the CID hole may be more stably closed.

In addition, in the secondary battery according to the present invention, the sealing ball may be inserted into the interconnected CID hole. Due to this feature, when the gas generated in the can is completely discharged, the vent hole and the CID hole may be sealed to prevent the electrolyte within the can from being discharged to the outside, thereby improving the safety.

In addition, in the secondary battery according to the present invention, the closing cover may be coupled to the top hole of the top cap. Due to this feature, the coupling between the external terminal and the top cap may be improved.

MODE FOR CARRYING OUT THE INVENTION

Figure 1:
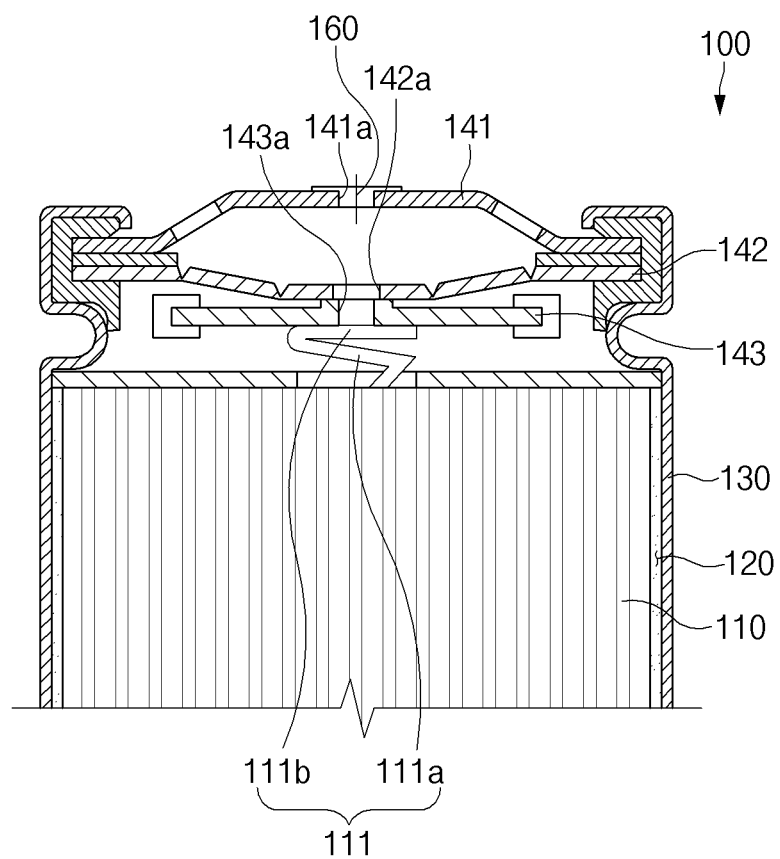
FIG. 1 is a cross-sectional view of a secondary battery according to a first embodiment of the present invention.
Figure 2:
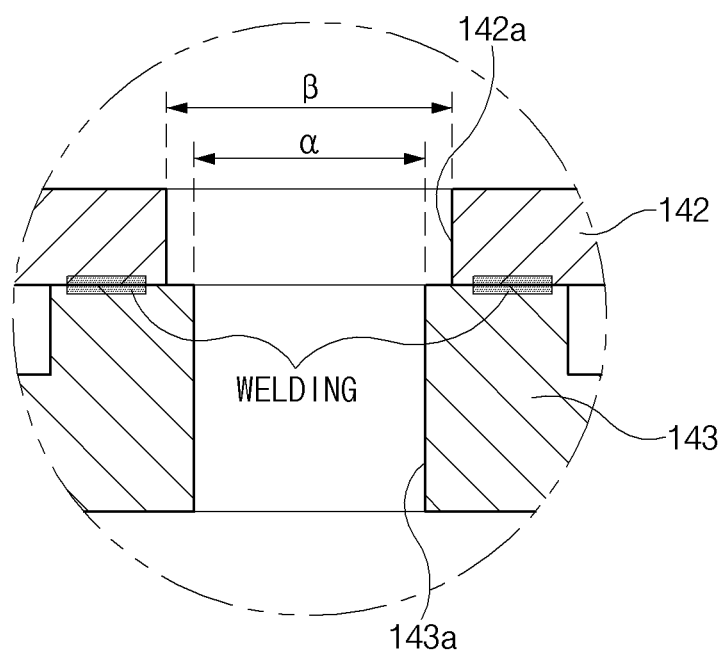
FIG. 2 is a partial enlarged view of FIG. 1.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Secondary Battery According to First Embodiment of the Present Invention]

As illustrated in FIGS. 1 to 6, a second battery 100 according to a first embodiment of the present invention comprises an electrode assembly 110, an electrolyte 120, a can 120 accommodating the electrode assembly 110 and the electrolyte 120, and a cap assembly 140 mounted on an opening of the can 130.

The electrode assembly 110 has a structure in which a positive electrode tab is provided That is, the electrode assembly 110 has a structure in which a plurality of electrodes and a plurality of separators are alternately stacked and wound in a roll shape. Also, the plurality of electrodes comprises a positive electrode and a negative electrode. Also, the positive electrode is provided with a positive electrode tab 111 coupled to the cap assembly 140, and the negative electrode is provided with a negative electrode tab coupled to a bottom surface of the can 130.

The electrolyte 120 is configured to improve performance of the electrode assembly and is impregnated into the electrode assembly while being injected into the can 130.

The can 130 comprises an accommodation part having an upper portion, which has an opened cylindrical shape, and a lower portion, in which the electrode assembly 110 and the electrolyte 120 are accommodated, and a sealing part having an upper portion on which the cap assembly 140 is mounted.

The cap assembly 140 is mounted on the opening of the can. Particularly, the cap assembly 140 may have a structure in which a gas generated in the can 130 in a process of activating the secondary battery is discharged to the outside.

That is, the cap assembly 140 comprises a top cap 141 through which a top hole 141a is formed to pass vertically, a safety vent 142 which is provided under the top cap 141 and in which a vent hole 142a is formed to pass vertically, and a current interrupt device (CID) filter 143 which is provided under the safety vent 142, to which the positive electrode 111 provided in the electrode assembly 110 is coupled, and through which a CID hole 143a is formed to pass vertically, wherein the CID hole 143a is closed or opened by the positive electrode tab 111.

Here, when the positive electrode 111 is in surface contact with the CID filter 143 composing the CID hole 143a, the CID hole 143a is closed, and when the positive electrode tab 111 is spaced apart from the CID filter 143 comprising the CID hole 143a, the CID hole 143a is opened.

Figure 3:
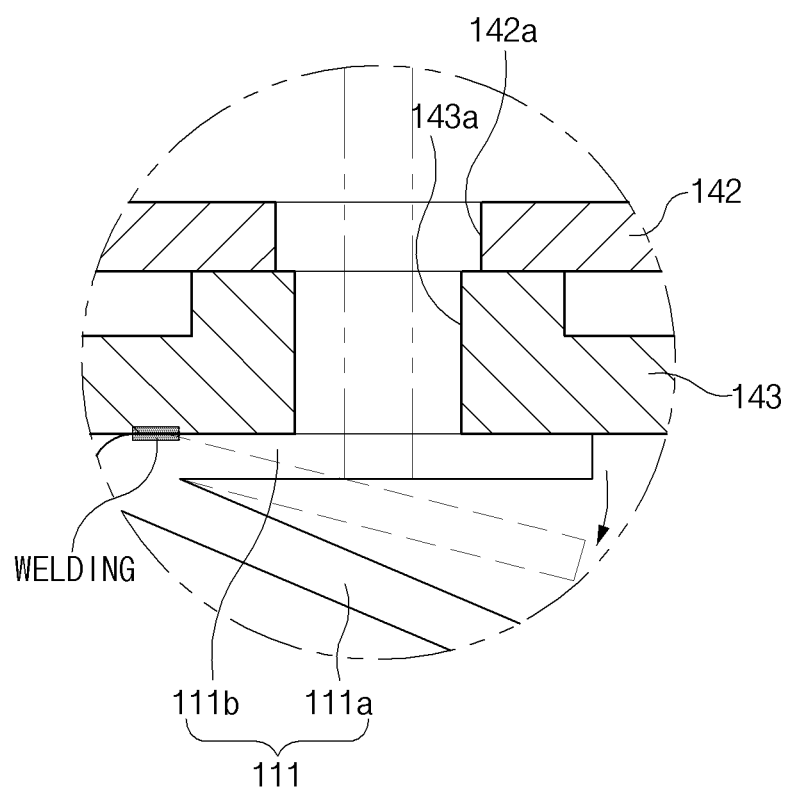
FIG. 3 is a view illustrating a state in which a positive electrode tab is pressed in the secondary battery according to the first embodiment of the present invention.
Figure 4:
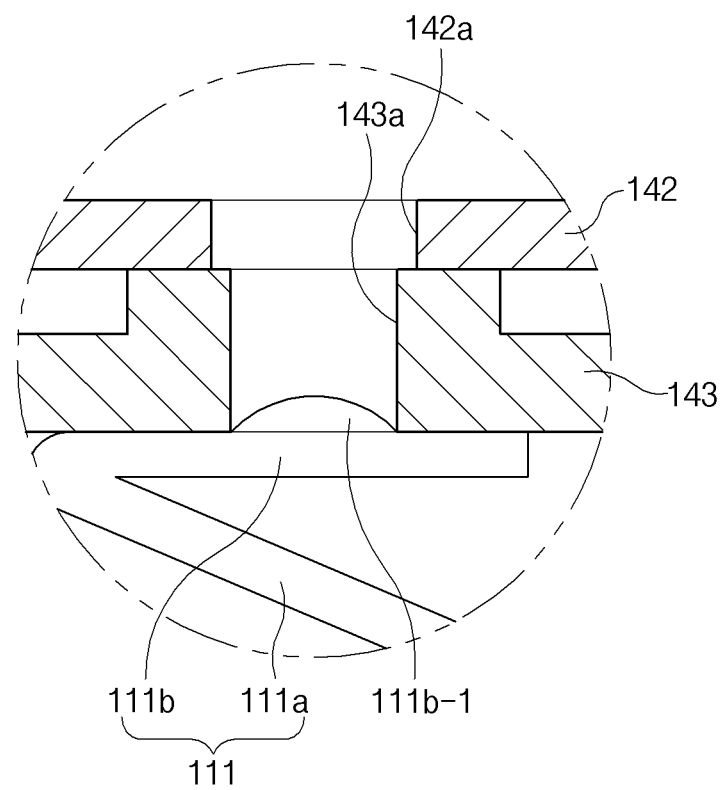
FIG. 4 is a cross-sectional view of a sealing protrusion formed on the positive electrode tab of the secondary battery according to the first embodiment of the present invention.
Figure 5:
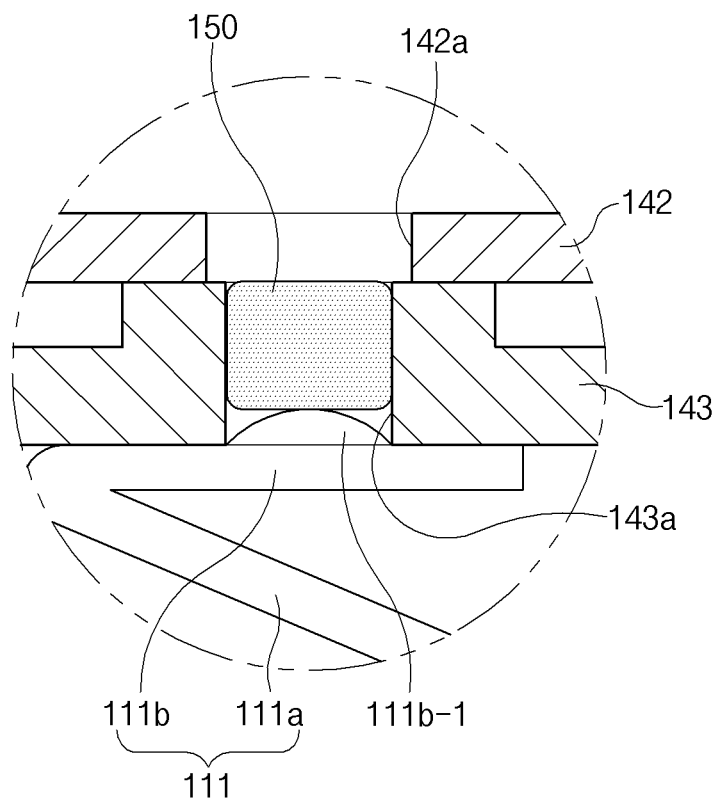
FIG. 5 is a cross-sectional view illustrating a sealing ball of the secondary battery according to the first embodiment of the present invention.
Figure 6:
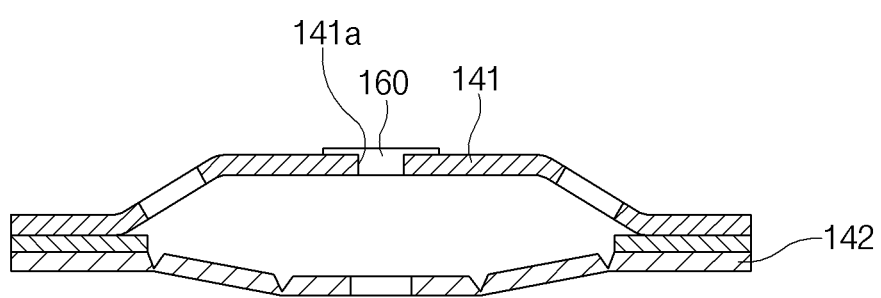
FIG. 6 is a cross-sectional view illustrating a closing cover of the secondary battery according to the first embodiment of the present invention.
Figure 7:
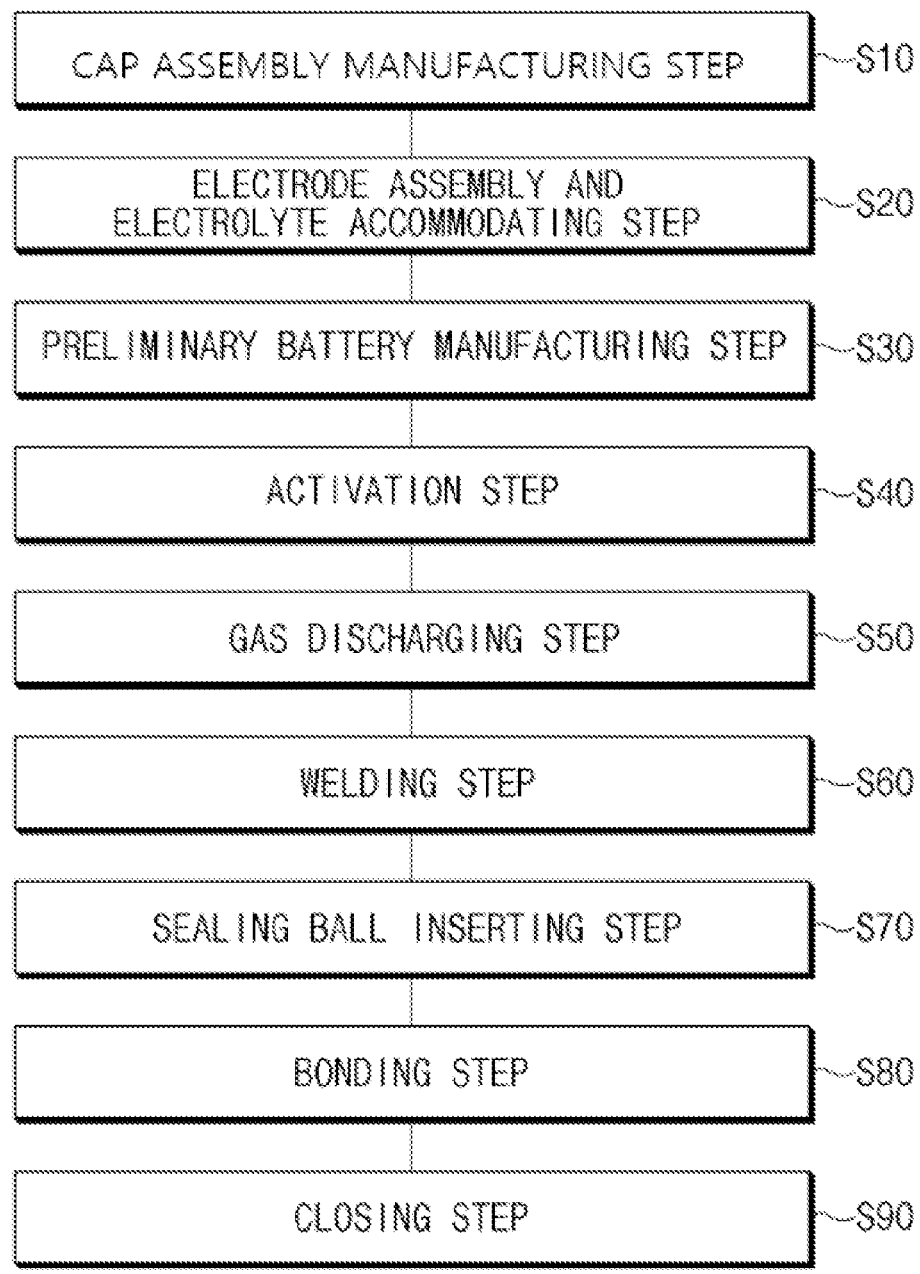
FIG. 7 is a flowchart illustrating a method for manufacturing the second battery according to the first embodiment of the present invention.

Referring to FIG. 3, in the cap assembly 143 having the above-described structure, a tool 1 having a long rod shape may pass through a top hole 141a of the top cap 141, a vent hole 142a of the safety vent 142, and the CID hole 143a of the CID filter 143, and then, the positive electrode tab 111 that closes the CID hole 143a may be pressed. Thus, when the CID hole 143a is opened, the gas generated in the can 130 may be disposed to the outside through the CID hole 143a, the vent hole 142a, and the top hole 141a to significantly improve performance of the secondary battery.

That is, in the secondary battery 100 according to the first embodiment of the present invention, since the CID hole 143a is closed by the positive electrode tab 111 in the activation process, charging and discharging may be stably performed. After the activation process, the gas generated in the can in the activation process may be discharged to the outside through the cap assembly 140. After the gas is discharged, the positive electrode tab 111 and the CID hole 143a may be welded to be sealed, thereby preventing the electrolyte from leaking.

Thus, the secondary battery 100 according to the first embodiment of the present invention may comprise the cap assembly 140 having a gas discharge structure. In the cap type secondary battery having the above-described feature, the gas generated in the can after the activation process may also be discharged to the outside to significantly improve the battery performance.

Here, each of the top hole 141a, the vent hole 142a, and the CID hole 143a has a minimum diameter into which the tool 1 is capable of being inserted. For example, each of the top hole 141a, the vent hole 142a, and the CID hole 143a may have a diameter of 1 mm to 3 mm to discharge the gas inside the can to the outside and also prevent foreign substances from being introduced into the top hole 141a, the vent hole 142a and the CID hole 143a.

Here, the top hole 141a, the vent hole 142a, and the CID hole 143a may be formed in the same vertical line. That is, referring to FIG. 1, the top hole 141a of the top cap 141, the vent hole 142a of the safety vent 142, and the CID hole 143a of the CID filter 143 are disposed in the vertical direction and also are disposed in the same vertical line. Thus, the positive electrode tab 111 that closes the CID hole 143a may be seen from the outside through the top hole 141a, the vent hole 142a, and the CID hole 143a. As a result, whether the CID hole 143a is closed may be easily confirmed from the outside the secondary battery. Particularly, since the top hole 141a, the vent hole 142a, and the CID hole 143a are disposed in a straight line, the positive electrode tab 111 may be more effectively pressed to open the CID hole 143a. Here, the top hole 141a is formed at a center point of the top cap, the vent hole 142a is formed at a center point of the safety vent, and the CID hole 143a is formed at a center point of the CID filter 143 to minimize weakness of strength.

The top hole 141a, the vent hole 142a, and the CID hole 143a may be partially disposed in the same vertical line. For example, only half of the top hole 141a, the vent hole 142a, and the CID hole 143a may be disposed in the same vertical line, and the other half may be disposed in a different vertical line. Accordingly, it is possible to significantly prevent an unnecessary object from being introduced into the top hole 141a, the vent hole 142a, and the CID hole 143a, and in particular, it is possible to prevent the positive electrode tab from being pressed by the unnecessary object.

The vent hole 142a may have a diameter $\beta$ greater than a diameter $\alpha$ of each of the top hole 141a and the CID hole 143a. That is, when a tool for pressing the positive electrode tab 111 is inserted, it may be difficult to easily insert the tool into the vent hole 142a disposed in the middle of the top hole 141a and the CID hole 143a due to a movement phenomenon of the tool. Thus, the vent hole 142a may have a diameter greater than that of the top hole 141a and the CID hole 143a so that the tool passing through the top hole 141a easily passes through the vent hole 142a. Particularly, it is possible to prevent the vent hole 142a from being damaged by the tool for pressing the positive electrode tab 111. That is, the safety vent 142 may be cut so as to prevent explosion of the secondary battery, and defects of the safety vent may occur due to damage of the vent hole 142a. To prevent this problem, the vent hole 142a may have a diameter greater than that of each of the top hole 141a and the CID hole 143a to prevent the vent hole 142a from being damaged. For example, each of the top hole 141a and the CID hole 143a has a diameter $\alpha$ of 2 mm, and the vent hole 142a has a diameter of 3 mm.

The vent hole 142a and the CID hole 143a may be connected to each other while the safety vent 142 and the CID filter 143 are coupled to each other. Thus, the vent hole 142a and the CID hole 143a may be disposed in the same vertical line. Particularly, an outer circumferential surface of the vent hole 142a and an outer circumferential surface of the CID hole 143a may be coupled to be sealed, thereby preventing foreign substances from being introduced into or preventing the electrolyte from leaking from the vent hole 142a and the CID hole 143a through a gap between the safety vent 142 and the CID filter 143.

The positive electrode tab 111 includes a lower tab part 111a and an upper tab part 111b. The lower tab part 111a is connected to the positive electrode of the electrode assembly 110, and the upper tab part 111b has one end connected to the lower tab part 111a and coupled to the CID filter 143 and the other end that in surface contact with a bottom surface of the CID filter 143, in which the CID hole 143a is formed, to close the CID hole. That is, the upper tab part 111b is in surface contact with the CID filter 143, one end of the upper tab part is coupled to the CID filter 143 by welding, and the other end is in surface contact with the CID filter 143 comprising the CID hole 143a to close the CID hole. Here, when the other end of the upper tab part 111b that closes the CID hole 143a is pressed, the other end of the upper tab part 111b is separated from the CID hole 143a to open the CID hole 143a. When force of pressing the other end of the upper tab part is removed, the other end of the upper tab part 111b is in surface contact with the CID filter comprising the CID hole 143a again by restoring force of the upper tab part 111b to close the CID hole.

Thus, the positive electrode tab 111 may stably close the CID hole till the activation process of the secondary battery, and after the activation process, when the positive electrode tab 111 is spaced apart from the CID filter 143, the CID hole may be opened to easily discharge the gas within the can to the outside.

After the gas is discharged, an inner circumferential surface of the CID hole 143a and the positive electrode tab 111 are coupled to be sealed. That is, the other end of the upper tab part 111b that is in surface contact with a bottom surface of the CID filter 143 is sealedly coupled to the CID filter 143 after discharging the gas to prevent the CID hole from being opened again, thereby preventing the electrolyte from leaking.

The positive electrode tab 111 is made of a material having elastic restoring force. Thus, the other end of the upper tab part 111b is elastically in surface contact with the bottom surface of the CID filter 143 to stably close the CID hole 143a. Particularly, when external force of pressing the other end of the upper tab part 111b is removed, the other end of the upper tab part 111b quickly returns to its original position by the elastic restoring force, and as a result, the CID hole 143a may be quickly and stably closed. Here, the positive electrode tab 111 may be alloy steel containing a material having the elastic restoring force.

The positive electrode tab 111 comprises a sealing protrusion 111b-1 inserted into the CID hole 143a. That is, the sealing protrusion 111b-1 is configured to increase in sealing force between the positive electrode tab 111 and the CID hole 143a. The sealing protrusion 111b-1 has the same diameter as the CID hole 143a. Thus, the sealing protrusion 111b-1 is inserted into the CID hole 143a to increase in sealing force between the positive electrode tab 111 and the CID hole 143a. Particularly, the sealing protrusion 111b-1 is formed as a hemispherical protrusion. Thus, the sealing protrusion 111b-1 may be easily coupled to the CID hole 143a or may be easily separated from the CID hole 143a.

When the discharge of the gas generated in the can is completed, the sealing ball 150 is inserted into the CID hole 143a. The sealing ball 150 is configured to seal the CID hole 143a and has a spherical shape. Here, the sealing ball 150 is inserted into the CID hole 143a through the top hole 141a and the vent hole 142a to seal the CID hole 143a. Particularly, the sealing ball 150 is melted through a heat fusion device (not shown). Thus, the sealing ball 150 may be in contact with an inner circumferential surface of the CID hole 143a to increase in sealing force between the CID hole 143a and the sealing ball 150.

The cap assembly 140 further comprises a closing cover 160 coupled to the top hole 141a. That is, the closing cover 160 is configured to increase in connectivity of a connection terminal connected to the top cap 141 and is made of the same material as the top cap 141. Thus, the introduction of the foreign substances through the top hole 141a may be blocked, and the connectivity of the connection terminal may be improved.

Hereinafter, a method for manufacturing a secondary battery according to the present invention will be described.

[Method for Manufacturing Secondary Battery According to First Embodiment of the Present Invention]

As illustrated in FIGS. 7 to 16, a method for manufacturing a secondary battery according to the first embodiment of the present invention comprises a cap assembly manufacturing step (S10), an electrode assembly and electrolyte accommodation step (S20), a preliminary battery manufacturing step (S30), an activation step (S40), a gas discharge step (S50), a welding step (S60), a sealing ball insertion step (S70), a bonding step (S80), and a closing step (S90).

Figure 8:
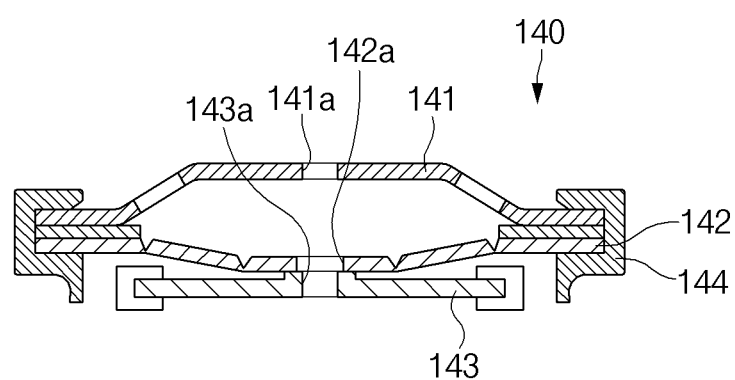
FIG. 8 is a cross-sectional view illustrating a cap assembly manufacturing step of method for manufacturing the second battery according to the first embodiment of the present invention.

Referring to FIG. 8, the cap assembly manufacturing step (S10) comprises a cap assembly punching process and a cap assembly assembling process. In the cap assembly punching process, a top hole 141a that passes vertically through a center of a top surface of a top cap 141 is punched using a punching device (not shown), a vent hole 142a that passes vertically through a center of a top surface of a safety vent 142 is punched using the punching device (not shown), and a CID hole 143a that passes vertically through a center of a top surface of a CID filter 143 is punched using the punching device (not shown).

Here, the top hole 141a, the vent hole 142a, and the CID hole 143a are punched to be disposed in the same vertical line when the cap assembly is manufactured. This is done for stably inserting the tool to pass through the top hole 141a, the vent hole 142a, and the CID hole 143a.

Here, the vent hole 142a is punched with a diameter greater than that of each of the top hole 141a and the CID hole 143a to prevent the vent hole 142a from being damaged by the tool passing through the top hole 141a. For example, the vent hole 142a has a diameter greater 1 mm to 2 mm than that of each of the top hole 141a and the CID hole 143a.

In the cap assembly assembling process, the top cap 141 having the top hole 141a is disposed at an upper side, the safety vent 142 having the vent hole 142a is disposed under the top cap 141, and the CID filter 143 having the CID hole 143a is disposed under the safety vent 142. Here, the top hole 141a of the top cap 141, the vent hole 142a of the safety vent 142, and the CID hole 143a of the CID filter 143 are disposed in the same vertical line. Also, a gasket 144 is coupled to surround outer circumferential surfaces of the top cap and the safety vent.

The cap assembly manufacturing step (S10) further comprises a safety vent and CID filter coupling process. In the safety vent and CID filter coupling process, a bonding device is inserted through the top hole 141a, and the safety vent 142 is in close contact with a top surface of the CID filter 143 to connect the vent hole 142a to the CID hole 143a. In this state, heat is applied to couple the safety vent 142 to the CID filter 143.

Here, the safety vent 142 and the CID filter 143 are coupled to each other so that a gap between the vent hole 142a and the CID hole 143a is completely sealed. That is, an outer circumferential surface of the vent hole and an outer circumferential surface of the CID hole, which correspond to each other, are coupled to be sealed.

When the cap assembly manufacturing step (S10) is completed, a cap assembly having the top hole, the vent hole, and the CID hole may be manufactured.

Thus, when the above-described process is completed, the cap assembly 140 is completed.

Figure 9:
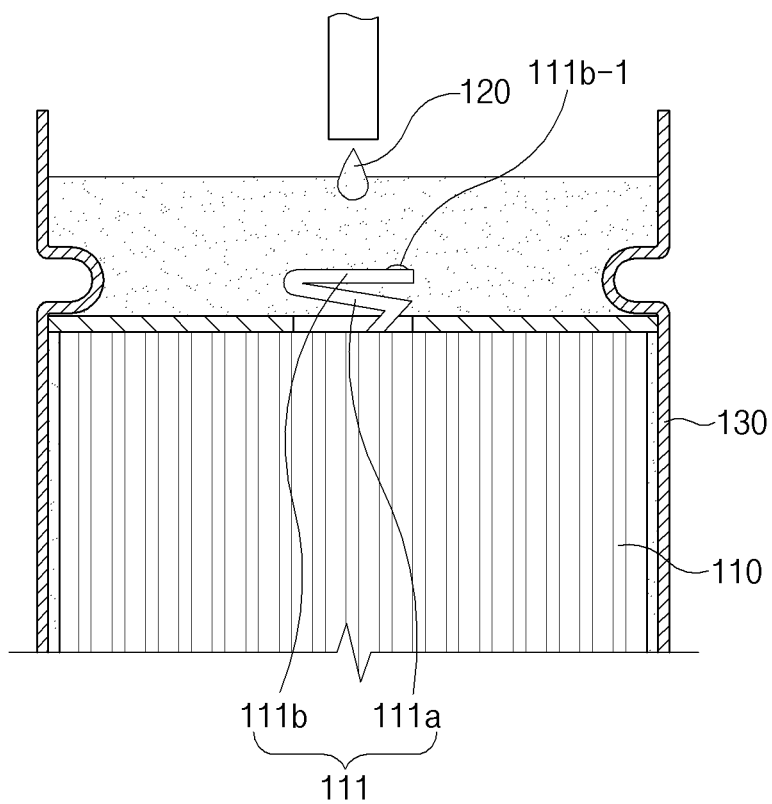
FIG. 9 is a cross-sectional view illustrating an electrode assembly and electrolyte accommodation step of the method for manufacturing the secondary battery according to the first embodiment of the present invention.

In the electrode assembly and electrolyte accommodation step (S20), referring to FIG. 9, after accommodating the electrode assembly 110 through an opening of a can 130, an electrolyte 120 is injected into the can 130. As a result, the electrolyte is impregnated into the electrode assembly 110.

Here, the electrode assembly 110 has a structure in which a plurality of electrodes and a plurality of separators are alternately stacked and wound in a roll shape. The plurality of electrodes comprise a positive electrode and a negative electrode. Also, the positive electrode is provided with a positive electrode tab 111 coupled to the cap assembly 140, and the negative electrode is provided with a negative electrode tab coupled to a bottom surface of the can 130.

Figure 10:
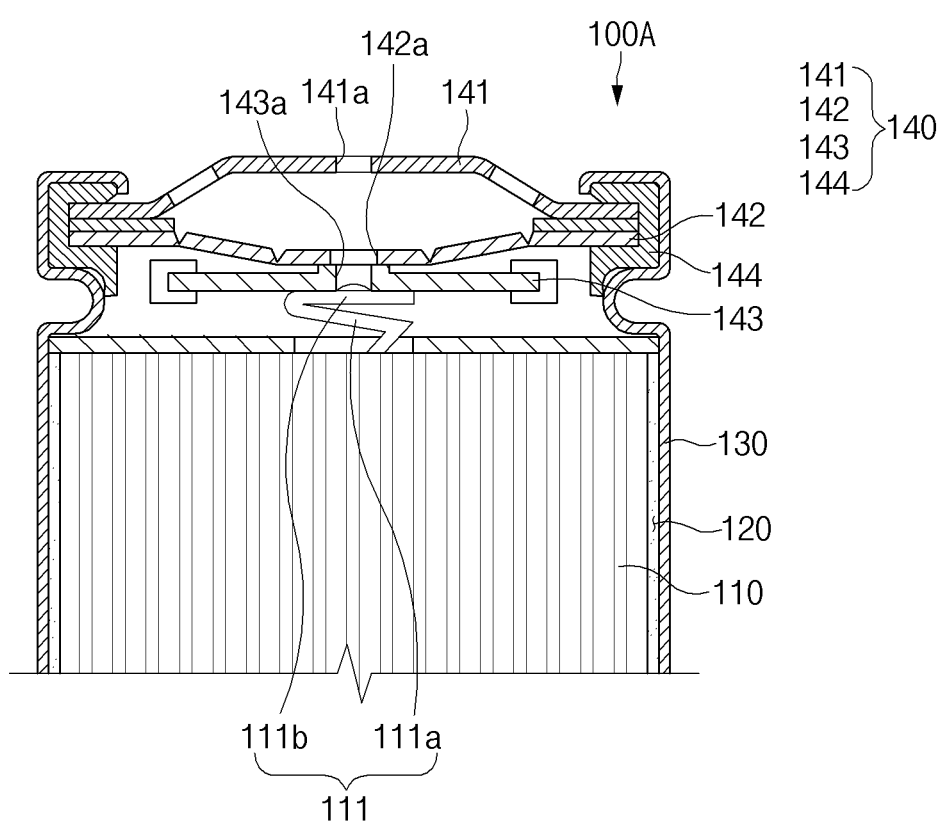
FIG. 10 is a cross-sectional view illustrating a preliminary battery manufacturing step of the method for manufacturing the secondary battery according to the first embodiment of the present invention.

Referring to FIG. 10, the preliminary battery manufacturing step (S30) is performed to manufacture an uncharged and undischarged preliminary battery and comprises an arrangement process and a coupling process.

In the arrangement process, the cap assembly 140 is disposed on the can 130. Here, the cap assembly 140 is disposed so that the CID filter 143 of the cap assembly 140 and the positive electrode tab 111 of the electrode assembly 110 are close to each other.

In the coupling process, the positive electrode tab 111 provided in the electrode assembly 110 is coupled to the CID filter 143 of the cap assembly 140 in a state in which the CID hole 143a closed. The positive electrode tab 111 comprises a lower tab part 111a connected to the electrode assembly 110 and an upper tab part 111b connected to the lower tab part 111a.

That is, in the coupling process, the upper tab part 111b is in surface contact with the bottom of the CID filter 143a, and then, the other end of the upper tab part 111b moves to close the CID hole 143a. Then, one end of the upper tab part 111b is welded and coupled to the bottom surface of the CID filter 143. In other words, the upper tab part 111b has the other end that is in surface contact with the bottom surface of the CID filter 143 comprising the CID hole 143a to close the CID hole 143a and one end welded to the CID filter 143a to couple the CID filter to the positive electrode tab. Particularly, the positive electrode tab 111 has elastic force in a direction of the CID hole 143a to stably close the CID hole 143a.

The other end of the upper tab part 111b of the positive electrode tab 111 comprises a sealing protrusion 111b-1 formed as a hemispherical protrusion. That is, in the bonding process, the sealing protrusion 111b-1 may be inserted into the CID hole 143a to increase in coupling force and sealing force between the positive electrode tab and the CID hole.

When the coupling of the positive electrode tab and the cap assembly is completed as described above, the cap assembly 140 is coupled to an opening of the can 130. As a result, a preliminary battery 100A is completed.

Figure 11:
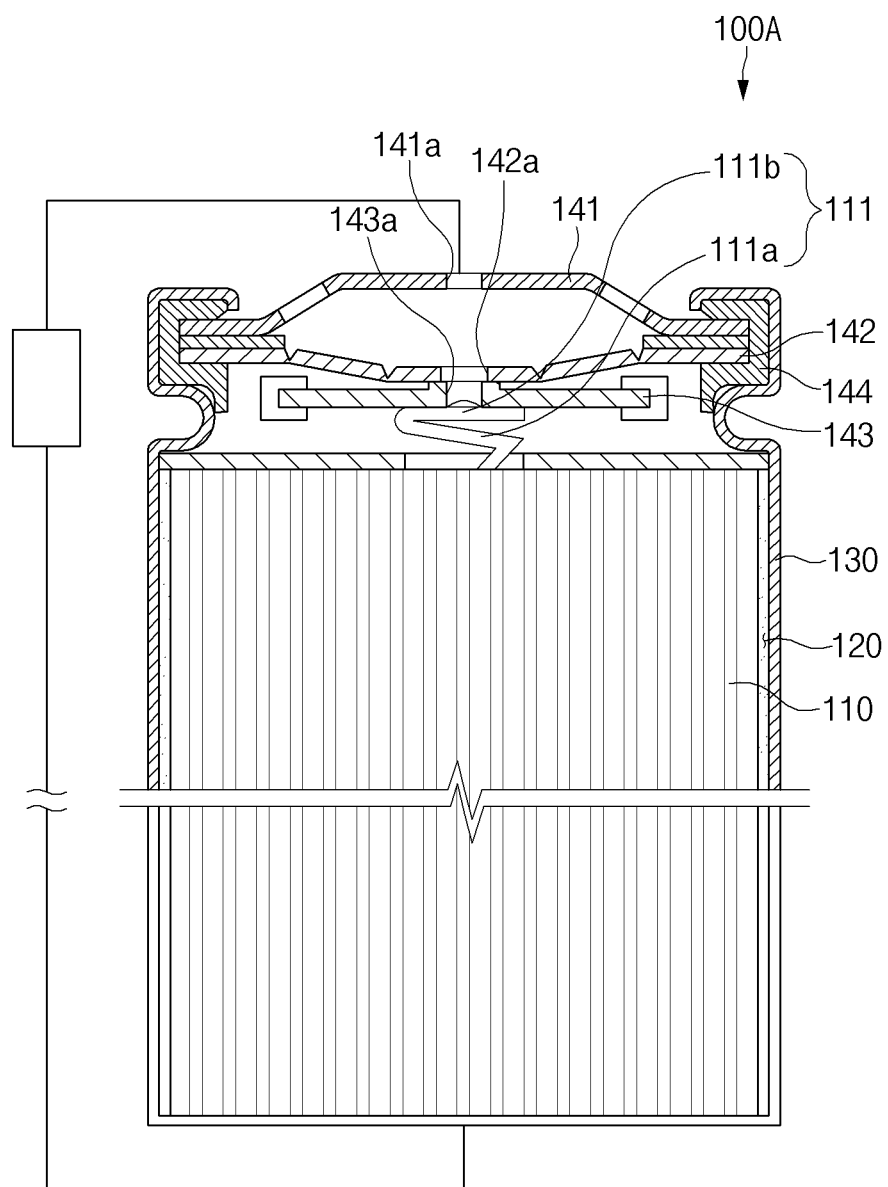
FIG. 11 is a cross-sectional view illustrating an activation step of the method for manufacturing the secondary battery according to the first embodiment of the present invention.

In the activation step (S40), referring to FIG. 11, the preliminary battery 100A is charged and discharged to be activated. Here, a gas is generated in the can due to a mutual reaction between the electrode assembly and the electrolyte, and the gas is accumulated in the can 130 to increase in pressure.

Figure 12:
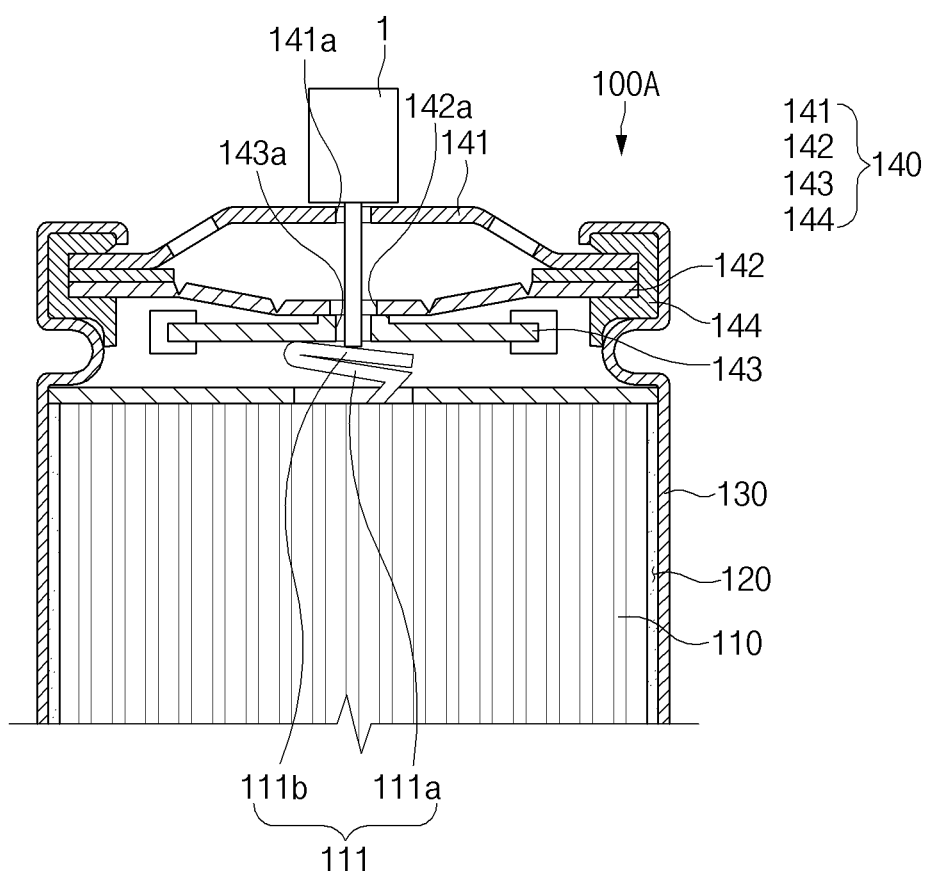
FIG. 12 is a cross-sectional view illustrating a gas discharge step of the method for manufacturing the secondary battery according to the first embodiment of the present invention.

In the gas discharge step (S50), referring to FIG. 12, the gas generated in the can 130 is discharged to the outside through the cap assembly 140 of the preliminary battery 100A. That is, a tool 1 is inserted through the top hole 141a, the vent hole 142a, and the CID hole 143a of the cap assembly 140 to press the positive electrode tab 111, which is in close contact with the CID filter 143, downward. As a result, while the CID hole 143a is opened, the gas generated in the can 130 is discharged to the outside through the CID hole 143a, the vent hole 142a, and the top hole 141a.

Thereafter, when the tool 1 pressing the positive electrode tab 111 is removed, the positive electrode tab 111 may return to its original position to close the CID hole 143a again.

Figure 13:
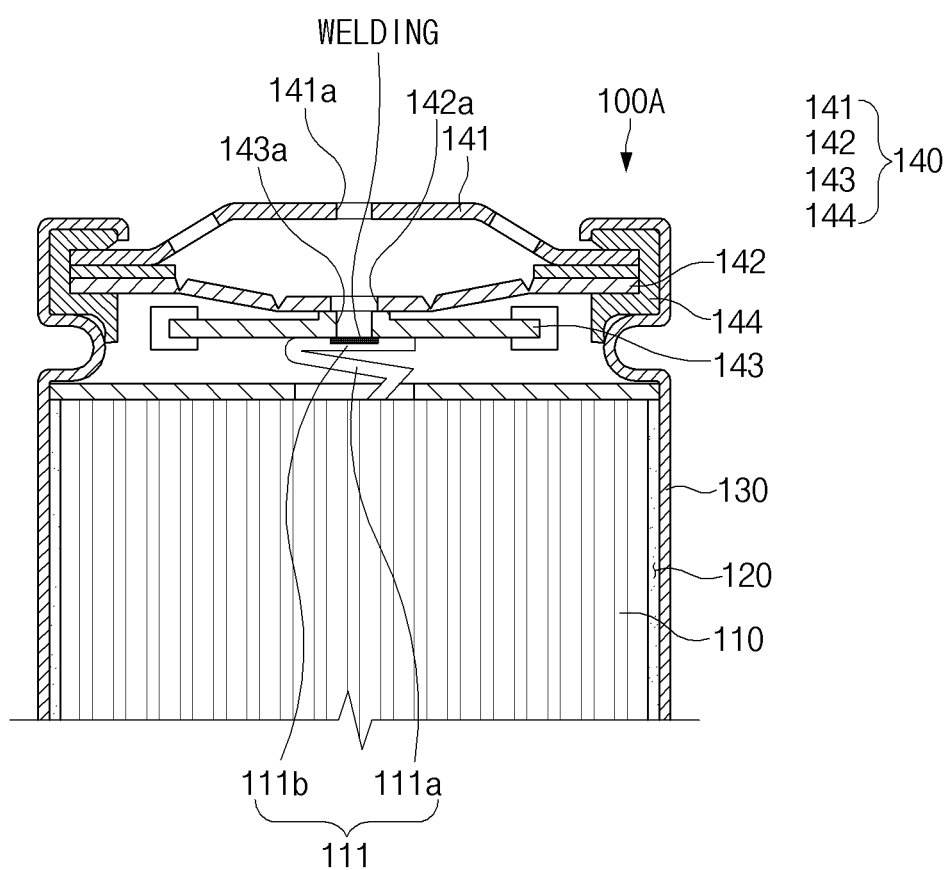
FIG. 13 is a cross-sectional view illustrating a welding step of the method for manufacturing the secondary battery according to the first embodiment of the present invention.

In the welding step (S60), referring to FIG. 13, the CID hole is closed so that the electrolyte inside the can is not discharged to the outside through the CID hole, the vent hole, and the top hole of the cap assembly. That is, in the welding step (S60), a welding device is inserted through the top hole 141a, the vent hole 142a, and the CID hole 143a of the cap assembly 140 to weld a lower end of an inner circumferential surface of the CID hole 143a to the positive electrode tab 111. Particularly, a gap between the CID filter 143 and the positive electrode tab 111 is sealed by performing the welding along the inner circumferential surface of the CID hole 143a that is in close contact with the positive electrode tab 111.

Figure 14:
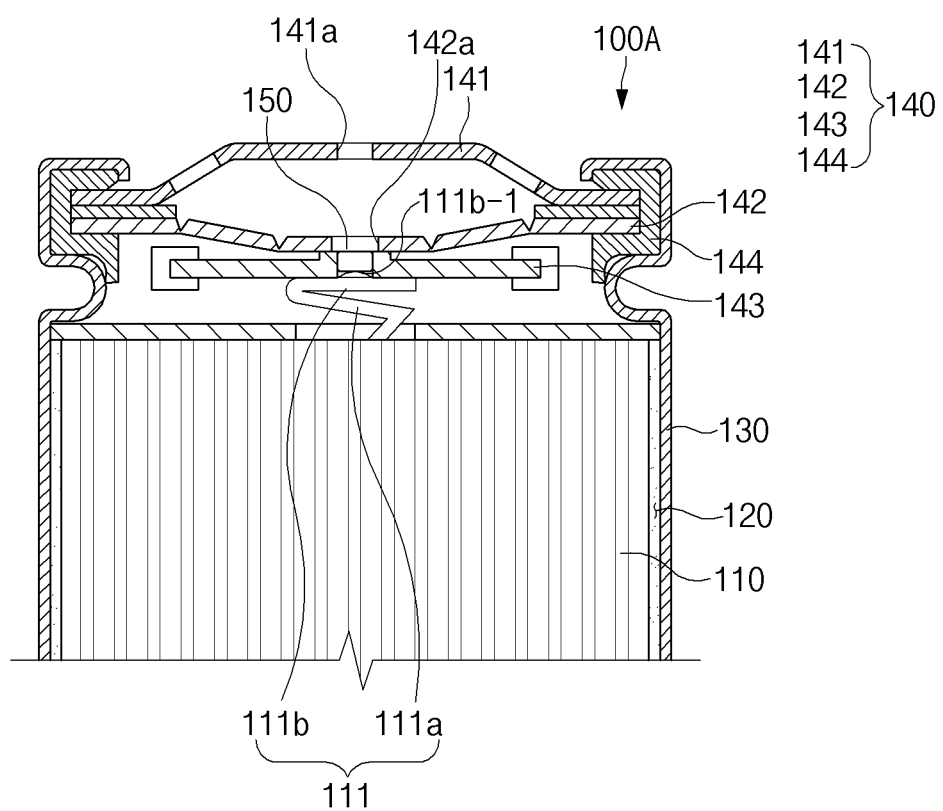
FIG. 14 is a cross-sectional view illustrating a sealing ball insertion step of the method for manufacturing the secondary battery according to the first embodiment of the present invention.

In the sealing ball insertion step (S70), referring to FIG. 14, the sealing ball 150 is press-fitted into the CID hole 143a through the top hole 141a and the vent hole 142a. As a result, the CID hole may be effectively sealed.

Figure 15:
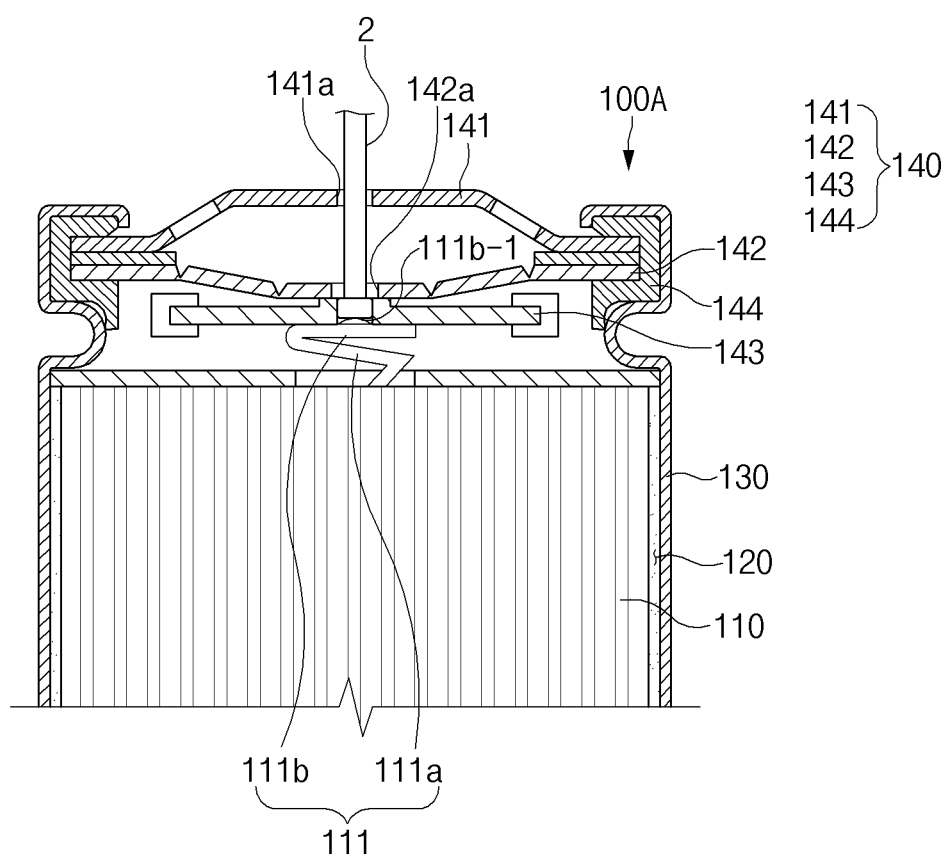
FIG. 15 is a cross-sectional view illustrating a bonding step of the method for manufacturing the secondary battery according to the first embodiment of the present invention.

In the bonding step (S80), referring to FIG. 15, a melting device 2 is inserted through the top hole 141a and the vent hole 142a, and then, a portion of the sealing ball 150 is melted to seal the sealing ball 150 and the CID hole 143a, which are in close contact with each other. As a result, the CID hole may be completely sealed.

Figure 16:
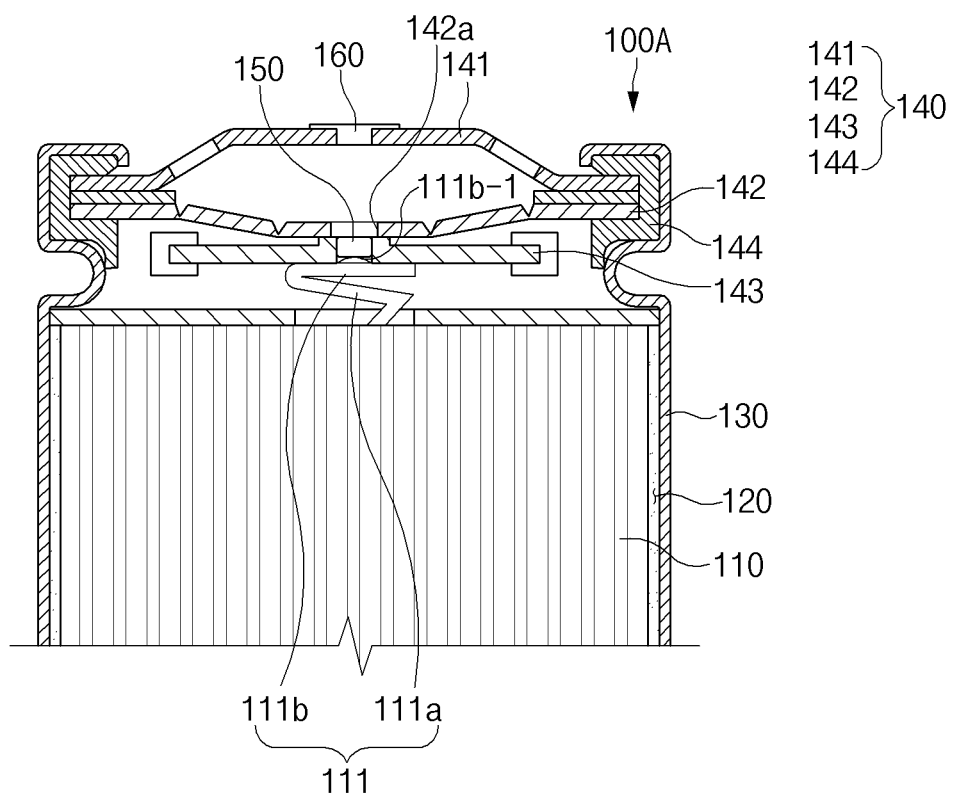
FIG. 16 is a cross-sectional view illustrating a closing step of the method for manufacturing the secondary battery according to the first embodiment of the present invention.

In the closing step (S90), referring to FIG. 16, a closing cover 160 is coupled to the top hole 141a to close the top hole 141a. Here, the closing cover 160 is made of the same material as the top cap 141. When the closing step is completed, the finished secondary battery 100 is completed.

Thus, in the method for manufacturing the secondary battery according to the first embodiment of the present invention, the secondary battery from which the gas is discharged may be manufactured.

Hereinafter, in descriptions of another embodiment of the present invention, constituents having the same function as the above-mentioned embodiment have been given the same reference numeral in the drawings, and thus duplicated description will be omitted.

[Battery Pack According to Second Embodiment of the Present Invention]

Figure 17:
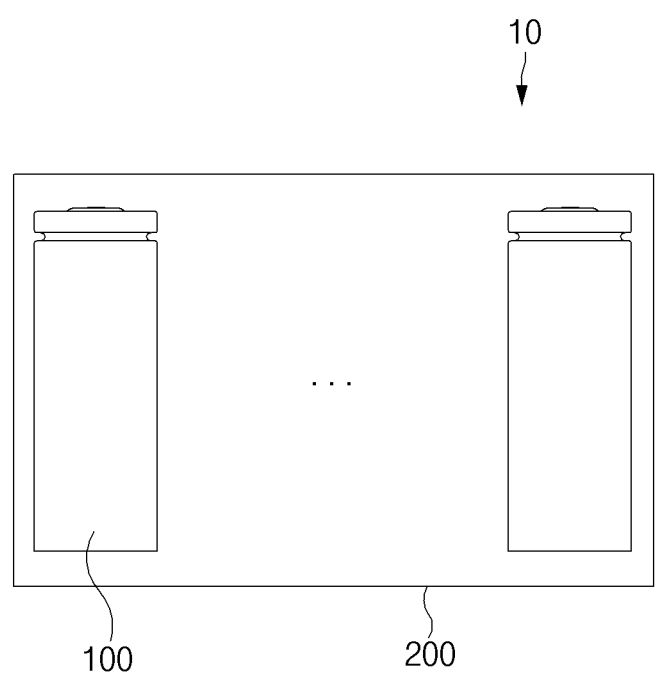
FIG. 17 is a view of a battery pack according to a second embodiment of the present invention.

As illustrated in FIG. 17, a battery pack 10 according to a second embodiment of the present invention comprises a secondary battery 100 and a battery case 200 in which one or more secondary batteries 100 are accommodated.

Here, the secondary battery 100 may have the same configuration and function as the secondary battery according to the foregoing first embodiment, and thus, duplicated descriptions will be omitted.

Thus, the battery pack 10 according to the second embodiment of the present invention may comprise the secondary battery, from which a gas within a can is discharged, to significantly improve battery performance.

[Method for Manufacturing Battery Pack According to Second Embodiment of the Present Invention]

A method for manufacturing a battery pack according to a second embodiment of the present invention comprises a step of manufacturing a secondary battery 100 and a step of accommodating the secondary battery 100 in a battery case 200.

Here, the step of manufacturing the secondary battery 100 has the same as the above-described method for manufacturing the secondary battery, and thus, duplicate descriptions will be omitted Thus, in the method for manufacturing the battery pack according to the second embodiment of the present invention, a battery pack 10 comprising the secondary battery from which a gas generated in an activation step is discharged may be manufactured.

[Cap Assembly According to Third Embodiment of the Present Invention]

Figure 18:
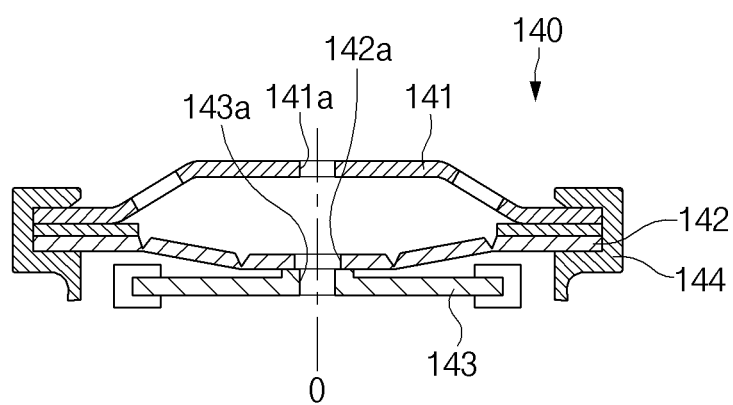
FIG. 18 is a cross-sectional view of a cap assembly according to a third embodiment of the present invention.

As illustrated in FIG. 18, a cap assembly 140 according to a third embodiment of the present invention comprises a top cap 141 in which a top hole 141a is formed to pass vertically, a safety vent 142 which is provided under the top cap 141 and in which a vent hole 142a is formed to pass vertically, and a CID filter 143 which is provided under the safety vent 142 and in which a CID hole 143a is formed to pass vertically.

The top hole 141a, the vent hole 142a, and the CID hole 143a are formed in the same vertical line O.

Here, the cap assembly according to the third embodiment of the present invention has the same configuration and function as the above-described cap assembly comprised in the secondary battery, and thus, duplicate descriptions will be omitted.

Thus, in the cap assembly according to the third embodiment of the present invention, a gas within a can may be discharged to the outside through the top hole 141a, the vent hole 142a, and the CID hole.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

10: Battery pack
100: Secondary battery
110: Electrode assembly
120: Electrolyte
130: Can
140: Cap assembly
141: Top cap
142: Safety vent
143: CID filter
150: Sealing ball
160: Closing cover
200: Battery case

The invention claimed is:

1. A secondary battery comprising:
an electrode assembly;
a can accommodating the electrode assembly therein, the can having a longitudinal axis extending in a vertical direction;
an electrolyte impregnated into the electrode assembly within the can; and
a cap assembly mounted on an opening of the can,
wherein the cap assembly comprises:
a top cap in which a top hole extends therethrough in the vertical direction;
a safety vent which is provided under the top cap and in which a vent hole extends therethrough in the vertical direction; and
a current interrupt device (CID) filter which is provided under the safety vent, to which a positive electrode tab of the electrode assembly is coupled, and in which a CID hole extends therethrough in the vertical direction, wherein the CID hole is configured to be closed or opened by movement of the positive electrode tab, and
wherein the top hole, the vent hole, and the CID hole are configured to receive insertion of a tool therethrough after initial charging of the secondary battery to open the CID hole by the movement of the positive electrode tab to discharge a gas therethrough.

2. The secondary battery of claim 1, wherein the top hole, the vent hole, and the CID hole are formed along a same line extending in the vertical direction, and the positive electrode tab is visible from an outside of the secondary battery through the top hole, the vent hole, and the CID hole.

3. The secondary battery of claim 1, wherein the vent hole has a diameter greater than respective diameters of each of the top hole and the CID hole.

4. The secondary battery of claim 1, wherein the safety vent and the CID filter are coupled to each other, thereby connecting the vent hole to the CID hole.

5. The secondary battery of claim 4, wherein a gap between an outer circumferential surface of the vent hole and an outer circumferential surface of the CID hole is sealed.

6. The secondary battery of claim 4, further comprising a sealing ball disposed in the CID hole.

7. The secondary battery of claim 1, wherein the positive electrode tab comprises a lower tab part and an upper tab part,
wherein the lower tab part is connected to the electrode assembly, and
the upper tab part has a first end connected to both the lower tab part and the CID filter and a second end opposite the first end that is configured to be selectively in surface contact with or separated from a bottom surface of the CID filter to close or open the CID hole.

8. The secondary battery of claim 7, wherein the positive electrode tab is made of a material having an elastic restoring force so that the second end of the upper tab part is elastically in surface contact with the bottom surface of the CID filter.

9. The secondary battery of claim 7, wherein a lower end of an inner circumferential surface of the CID hole and the positive electrode tab are configured to be selectively sealed to one another.

10. The secondary battery of claim 1, wherein the positive electrode tab comprises a sealing protrusion configured to be inserted into the CID hole to seal the CID hole.

11. The secondary battery of claim 10, wherein the sealing protrusion is a hemispherical protrusion extending from a surface of the positive electrode tab.

12. The secondary battery of claim 1, further comprising a closing cover coupled to the top hole, wherein the closing cover is made of a same material as the top cap.

13. A battery pack comprising:
one or more secondary batteries each according to claim 1; and
a battery case accommodating the one or more secondary batteries therein.

* * * * *